United States Patent [19]

Clarke et al.

[11] 4,073,672

[45] * Feb. 14, 1978

[54] POST-PRESS EMBOSSING OF A CONSOLIDATED MAN-MADE BOARD

[75] Inventors: John T. Clarke, St. Charles; Royce K. Harker, Lombard, both of Ill.; Michael E. Hittmeier, Towanda, Pa.; James W. Eaton, Elgin, Ill.

[73] Assignee: Masonite Corporation, Chicago, Ill.

[*] Notice: The portion of the term of this patent subsequent to Feb. 8, 1994, has been disclaimed.

[21] Appl. No.: 727,292

[22] Filed: Sept. 27, 1976

Related U.S. Application Data

[63] Continuation-in-part of Ser. No. 537,254, Dec. 30, 1974, Pat. No. 4,007,076.

[51] Int. Cl.² .............................................. B29J 5/04
[52] U.S. Cl. ................................... 156/219; 156/62.2; 264/119; 264/123
[58] Field of Search ............... 156/62.2, 62.8, 219, 156/220, 222, 312, 323; 162/136, 225; 144/327–328; 264/119, 120, 123; 428/171, 236, 301

[56] References Cited

U.S. PATENT DOCUMENTS

| | | | |
|---|---|---|---|
| 1,936,183 | 11/1933 | Beiger | 144/328 |
| 2,803,188 | 8/1957 | Duvall | 156/220 |
| 3,621,897 | 11/1971 | Vazzola et al. | 144/328 |
| 3,718,536 | 2/1973 | Downs et al. | 156/62.2 |
| 3,723,220 | 3/1973 | Scher et al. | 156/219 |
| 3,758,357 | 9/1973 | Akerson et al. | 156/196 |
| 3,761,338 | 9/1973 | Ungar et al. | 156/323 |
| 3,788,929 | 1/1974 | Huttunen | 156/221 |
| 3,948,708 | 4/1976 | Doerer | 144/327 |
| 4,007,076 | 2/1977 | Clarke et al. | 156/62.2 |

*Primary Examiner*—William K. Powell
*Assistant Examiner*—William A. Thrower
*Attorney, Agent, or Firm*—Richard H. Anderson

[57] ABSTRACT

A consolidated man-made board, such as hardboard, is wetted on one surface with a chemical, such as ammonium hydroxide, and thereafter embossed with a contoured embossing plate at a pressure of at least about 1000 p.s.i., at a temperature in the range of about 400°–550° F. and for a period of time sufficient to permanently reshape the surface of the consolidated board. The use of chemical wetting agents including ammonium hydroxide, mineral acids including hydrochloric, sulfuric, nitric and phosphoric acids, oxalic acid, and metheneamine is disclosed.

16 Claims, No Drawings

POST-PRESS EMBOSSING OF A CONSOLIDATED MAN-MADE BOARD

BACKGROUND OF THE INVENTION

This application is a continuation-in-part of co-pending application Ser. No. 537,254, now U.S. Pat. No. 4,007,076 filed Dec. 30, 1974.

A. Field of the Invention

This invention relates to a process for embossing a man-made board, and more particularly to a process for embossing or debossing a man-made cellulosic board at a high temperature and pressure after consolidation of the board. More specifically, the process of the present invention relates to embossing a man-made cellulosic board in a post-press embossing step.

Man-made consolidated boards include hardboard, chip board, particle board, panel board, acoustical board, insulation board and the like. The uses of such boards depend upon the physical characteristics such as the density of the board and the exterior embossing or decorative effect applied thereto. The qualities and physical characteristics of a board depend upon the conditions under which the board is manufactured, and the raw materials used to form the board.

There are two principal processes for the manufacture of man-made boards — the wet process and the dry process. In the wet process, the raw material is uniformly blended in a head box with copies quantities of water to form a slurry. The slurry is deposited onto a water-pervious support member, generally a Fourdrinier wire, where much of the water is removed leaving a wet mat of cellulosic material. The wet mat is transferred from the previous support member and consolidated under heat and pressure to form the board. Typically, pressures of from 400 to 500 p.s.i. and temperatures up to about 400° F. are encountered in consolidation of a man-made board manufactured by the wet process.

The dry process is similar to the wet process except that the cellulosic fibers are first coated with a thermosetting resin binder, such as a phenol-formaldehyde resin, and are then randomly distributed into a mat by air blowing the resin-coated fibers onto a support member. In the dry process, the mat is pressed at temperatures up to about 450° F. and pressures less than about 1000 p.s.i. to cure the thermosetting resin and to compress the mat into an integral consolidated structure.

The process of embossing a wet mat in a platen press with a heated embossing plate is well known, especially in the manufacture of hardboard. An embossing plate is made with a surface contour of a desired design, such as wood graining. The heated embossing plate is pressed against the surface of the wet mat under sufficient pressure to impress the plate design into the surface of the panel and thereby consolidate the wet mat into a decorative man-made board.

Boards made in accordance with the dry process are also typically decorated or surface-designed by hot-pressing in a platen press with a heated embossing plate. In embossing mats made by either the wet or dry process, however, the man-made mat is embossed concurrently with being compressed into a consolidated, integral product so that the bonds between fibers are initially made in accordance with the final surface design of the product.

Much of the bonding necessary for cohesion and strength in a man-made board occurs during the consolidation of the board. Prior to drying a board made by the wet process, the board is weak, but the bonding forces created during the final consolidation are generally quite powerful. Generally the same bonding effect occurs in the final consolidation of the board made by the dry process. Prior to hot-pressing, the loosely disassociated cellulosic fibrous product is quite weak, but after hot-pressing the mat into its final configuration, it is very powerfully held together by the bonding which occurs during hot-pressing. Hot-pressing during consolidation causes a welding or coalescing of the cellulose fibers at the surface of the product so that the surface portion consists of wood re-made in modified form. It is very difficult to reshape the surface of the consolidated product without again destroying these fiber-to-fiber surface welds.

As set forth above, the process of embossing a man-made board prior to consolidation to establish a surface design in a product is well known. However, because of the strong interfiber bonding which occurs during consolidation, no effective process has been developed by which a previously consolidated product can be post-press embossed to create a surface design or to re-design the surface of a consolidated product. To be effective, such a process cannot destroy the inter-fiber bonding established at the surface of the board during consolidation — yet the process must permanently reshape the surface of the product.

One of the most difficult problems found by applicant in reshaping the surface of a consolidated product is in maintaining "design fidelity" in the board. "Design fidelity" or simply "fidelity" as used herein is a measure of the accuracy of reproduction of the design of the embossing plate onto the surface of the consolidated board. Because of the strong interfiber bonding referred to above existing in a consolidated board, the reshaped surface has a tendency to "spring-back" to its original surface design. "Spring back" as used herein is the tendency of a reshaped board to return to its original surface shape or contour.

No existing process is able to maintain a high degree of fidelity over extended periods of time by embossing a consolidated product because of the strong inter-fiber bonding occurring during initial consolidation.

The present invention relates to a process of embossing a consolidated man-made cellulosic board in such a manner that the strong inter-fiber bonding established during consolidation densification is maintained, but the cellulosic material is apparently caused to "flow" to new locations to impart a different contour to the surface of the consolidated product. A process whereby a consolidated product can be embossed under heat and pressure, after already having undergone a first hot-press consolidation step, so that the inter-fiber bonds established during the first hot-press step are maintained, but re-oriented with the fibrous material in the new shape, is quite surprising in the art of man-made cellulosic board manufacture.

In accordance with the process set forth herein, a consolidated product is post-press embossed to establish new surface contours. The inter-fiber bonds established in initial consolidation are realigned to set the surface of the product permanently into a new design. The reshaping is very effective so that very little spring-back occurs.

B. Prior Art

Many patents disclose hot-pressing as a step for consolidating a man-made board into its final shape. Some of the hot-pressing consolidation procedures are disclosed in the following United States Pat. Nos. Newton 3,113,065; Linzell 2,388,487 and 3,002,878; Steward 2,888,376; Higgins 3,428,727; Akerson 3,758,357; Huttunen 3,788,929; Loughborough 2,298,017; Duvall 2,803,188; Maher 3,681,115; Willey et al. 2,495,043; Oshima et al. 3,699,203; and Downs 3,718,536. Some of the above patents also disclose the chemical treatment of the fibrous product prior to hot-pressing to enhance one or more properties of the final product. The following patents relate to the chemical treatment of a fibrous product: Kenaga 2,811,470; Brown 2,724,642; Ericks 2,692,183; Woodhouse 2,395,311; and Pratt 1,948,314. Of the above patents, the Akerson et al. 3,758,357; Huttunen 3,788,929 and Loughborough 2,298,017 patents disclose hot-pressing a wood product for the purpose of bending the product. However, none of these three patents discloses post-press embossing with a contoured embossing plate and therefore do not encounter the fidelity problems encountered in reshaping a previously consolidated product. The above-listed Downs 3,718,536 and Oshima 3,699,203 patents relate to a second hot-press step, but each patent discloses bonding the product into its final shape by providing a thermosettable plastic which sets on hot-pressing. The Duvall 2,803,188 patent relates to a hot-press embossing step after consolidation of an insulation board, but provides a hardenable coating composition so that spring-back over extended periods of time is not a significant factor.

SUMMARY OF THE INVENTION

In brief, the process of the present invention comprises the steps of wetting the surface of a consolidated man-made board with a chemical capable of preparing the surface of the board for reshaping, and then hot-pressing the wetted board with a heated embossing plate at a high temperature and pressure and for a period of time sufficient to permanently reshape the surface of the board.

Accordingly, an object of the present invention is to provide a new improved method of embossing a consolidated man-made board to permanently reshape the surface of the board.

Another object of the present invention is to post-press emboss a consolidated man-made board to provide a new and improved method of reshaping damaged or rejected consolidated man-made boards.

Another object of the present invention is to provide a new and improved method of embossing a consolidated man-made board by embossing under pressure sufficient to cause the fibrous material at the near and embossed surface of the board to laterally flow to a different location.

Another object of the present invention is to provide specific chemicals of suitably preparing the surface of a man-made board for embossing so that after the surface of the board has been wetted with one or more of these chemicals embossing under high pressure and temperature will permanently reshape the surface of the board.

These and other objects and advantages of the present invention will be better understood with reference to the following detailed description of the invention.

DETAILED DESCRIPTION

For effective post-press embossing of a consolidated man-made cellulosic board it has been found that it is necessary to wet the surface of the board with a particular chemical prior to hot-pressing. It is preferred to add a wetting agent to a liquid in an amount of about 0.1–0.5% by weight to achieve better and faster wetting of the surface prior to hot-pressing. The liquid can be applied to the surface of the consolidated board in any convenient manner such as by roller, spray or brush application.

A variety of chemicals have been found effective for wetting the surface of a man-made board prior to post-press embossing. It s preferred to employ the chemical in an aqueous solution in an amount of about 5–10 grams per square foot of surface area.

Mineral acids in a concentration of 1/4N to 2N have been found effective for wetting the surface of the man-made board prior to post-press embossing. Some of the effective mineral acids are hydrochloric, sulfuric, nitric, and phosphoric. A strong base such as ammonium hydroxide at a concentration of at least about 5N has also been found to be quite effective. Bases other than ammonium hydroxide are not effective in producing acceptable embossing. The only organic acid found to be effective is oxalic acid. Metheneamine is also effective. To achieve the full advantage of the invention using metheneamine, the concentration should be at least about 1N.

After the surface of the board has been wetted, the wetted board is subjected to a hot-press step at a temperature in the range of 400°–550° F., and at a pressure and for a period of time sufficient to establish and maintain accurate transference of detail from the embossing plate to the surface of the board for an extended period of time. Pressure is the most important variable in the pressure-temperature-time embossing conditions. By the appropriate selection of combinations of temperature, pressure, and time, a wetted consolidated man-made board can be embossed to reshape the surface with excellent design fidelity and very little spring-back.

PRESSURE-TEMPERATURE-TIME VARIABLES

With each pressure used there is a specific temperature range and time of embossing necessary to effectively reshape a consolidated man-made product. An increase in any variable (temperature, time or pressure) enables a decrease in one or more of the remaining variables necessary for effective post-press embossing. Many of the pressure-temperature-time interactions will be specifically set forth, and others can be extrapolated from the data set forth herein. The times indicated are times of embossing under full pressure and do not include the loading and unloading or the buildup and decrease of pressure in the press.

PRESSURE

A pressure of about 4000 p.s.i. is preferred, but a wide range of pressures above 1000 p.s.i. are useful in the post-press embossing of a consolidated man-made board.

1000 p.s.i.: Pressure as low as about 1000 p.s.i. requires an embossing temperature of about 525°–550° F. for a period of time of at least 15 seconds. At a pressure of about 1000 p.s.i. and a temperature of 550° F., most man-made boards begin to char after a period of about 30 seconds. It is important when using a press temperature of about 550° F. that the board be removed from the press before charring occurs.

2000 p.s.i.: At a pressure of about 2000 p.s.i. effective post-press embossing can be achieved with temperatures of about 400° F. for a period of time of about 40–60 seconds. At 2000 p.s.i., a temperature of at least 400° F. is necessary. Higher temperatures up to 550° F. can be employed with a corresponding decrease in time necessary for the required fidelity in the post-press embossed product. It is preferred to employ a temperature of at least 450° F. so that the press time can be reduced.

3000 p.s.i.: At a pressure of 3000 p.s.i. it is necessary to employ a temperature of at least about 400° F. for a period of time of about 15-30 seconds. With higher temperatures up to about 550° F., the time period can be reduced accordingly.

4000 p.s.i.: At pressures above 3000 p.s.i. and temperatures of 400°-550° F. the time necessary for effective post-press embossing is reduced to 1 to 15 seconds. Pressure higher than 4000 p.s.i. can be used with a corresponding decrease in press time, but higher capability presses do not provide any noticeable improvement.

TEMPERATURE

To achieve the necessary fidelity when post-press embossing a consolidated man-made board, it is always necessary to employ a temperature of at least about 400° F. and not greater than about 550° F. It has been found that temperatures below about 400° F. are insufficient to effectively re-design the surface of a consolidated board while achieving sufficient sustained design fidelity. Many of the products embossed in accordance with the process set forth herein may be subjected to the stress of outside weather conditions and must show sharp, crisp embossing contours over sustained periods of time. It is an important features of the present invention to always provide a temperature of at least about 400° F. in embossing. Temperatures above 550° F. cause charring and are therefore unsuitable. The most suitable embossing temperature is in the range of about 400°-500° F. when using a pressure in excess of 1500 p.s.i.

TIME

The period of time necessary for sufficient fidelity and permanence in reshaping the surface of a consolidated board is dependent upon the temperature and pressure employed. For example, at a pressure of 4000 p.s.i. and a temperature of 500° F. only about one second is required. At lower temperatures and/or pressures the time is increased accordingly. For example, at a temperature of 400° F. and pressure of 2000 p.s.i., the board must be hot-pressed at full pressure for a period of at least about 40 seconds. Other examples of embossing times required at various temperature and pressure conditions are set forth above under the headings PRESSURE and TEMPERATURE, and in the examples to follow.

CHEMICAL

The effectiveness of the chemical in preparing the surface of the board for reshaping, determines, to some extent, the severity of embossing conditions necessary for excellent design fidelity and permanence in reshaping. Ammonium hydroxide in a concentration of about 5N has been about to be an effective chemical for preparing the surface of a consolidated board for reshaping by post-press embossing. The embossing conditions necessary for permanently reshaping a consolidated board pre-treated with a 5N ammonium hydroxide solution therefore will not be quite as severe (lower temperature, pressure, and/or time required) as when the board is pre-treated with another wetting solution.

The mineral acids are next in terms of effectiveness in preparing a consolidated board for embossing, followed by oxalic acid, and metheneamine. The mineral acids, however, cause sticking of the board to the embossing plate, chemical attack on the embossing plate, and a buildup of solids. With a decrease of effectiveness of the wetting chemical, a slight increase in the severity of the embossing conditions is necessary to achieve excellent design fidelity and permanence is reshaping — the slight increase will become apparent in the examples to follow.

COMPRESSIBLE CUSHION

An important feature of the present invention is the provision of a compressible cushion or backing member disposed to overlie a flat surface of the embossing press. The compressible backing member provides a yieldable support for cushioning the non-embossed side of the man-made board during embossing. In this manner a consolidated man-made board can be embossed to exceptionally surprising depths without fracturing.

A compressible backing member overlying one side of a platen press enables embossing of consolidated products at depths heretofore unknown in post-press embossing. By employing a compressible backing, the composite board can actually be molded — that is, contoured on both faces. Deep grooves can be imparted to the surface to actually cause a deformation of the non-embossed side of the board. The cushion permits the deformation of the non-embossed side of the board. Molding with a compressible cushion is most advantageous when hot-pressing thinner boards where a deep pattern is desired. It is desirable to provide heat to both sides of the board during embossing to prevent warpage on removal from the press.

For use as a compressible cushion, many different materials are available, for example, a silicone rubber sheet, a porous or sponge rubber sheet, canvas, neoprene-coated asbestos cloth of four to six plies, or simply another piece of hardboard or other man-made board. It is preferred to use a permanently distortable compressible mat such as another piece of hardboard. A resilient cushion having a thickness of about ⅛ to ½ inch is generally sufficient for embossing any man-made board to any desired degree of contour. For example, when a series of products are manufactured from the same embossing plate, a consolidated board can be used as the cushion. After post-press embossing of one board, the cushion from that press step can be re-located to be embossed in the next pressing operation. This operation can be repeated using the cushion from one pressing operation as the product material to be embossed in the next successive embossing step.

Another important feature of the present invention is in the provision of a water-penetrable compressible backing member so that the liquid vaporized in the hot-press can escape through the man-made board and into the backing member. In this manner, a "breathing" step during embossing is unnecessary since it will be unnecessary to vent vapors to the atmosphere during pressing. The water-penetratable cushion can be used until it can absorb no more water. Advantageously, the backing member can be of the same material and dimension as the board being embossed. After embossing, the backing member can be repositioned to be embossed with a new backing member so that a new and water absorbent backing member is supplied for each embossing operation. In this manner, breathing is never necessary. Examples of typical breathing steps, made necessary in accordance with the present invention are set forth in the Egerstrand U.S. Pat. No. 3,112,243 at column 4, lines 42-51; and in the Grissom et al. U.S. Pat. No. 3,056,718 at column 3, lines 2-5.

If desired, a binder can be provided between the backing member and the man-made board so that after embossing, the backing member is laminated to the man-made cellulosic board as an integral part of the product. In cases where the composite board is molded in the press, the laminated backing member can provide a flat surface for ease in attachment of the molded product to an existing structure.

EXAMPLES

The following examples will more fully and completely disclose minimum conditions under which a consolidated board must be pressed to achieve excellent design fidelity and to permanently reshape the surface of a consolidated board. In each case, the time set forth achieved permanent sharp, crisp reproduction of the design of the embossing plate under the specified conditions of pressure, temperature and chemical. At 550° F., the board should be removed before charring occurs.

| Ex. No. | Pressure | Temp. (° F.) | Time (Sec.) | Hardboard: method made, thickness, sp. gr | Wetting Solution |
|---|---|---|---|---|---|
| 1 | 1000 | 550 | 30 | wet formed, ⅛", 0.95-1.00 | 5 N ammonium hydroxide |
| 2 | 1000 | 550 | 30 | wet formed, ⅛", 0.95-1.00 | 1 N oxalic acid |
| 3 | 1000 | 550 | 30 | wet formed, ⅛", 0.95-1.00 | 1 N metheneamine |
| 4 | 2000 | 450 | 30 | wet formed, ⅛", 0.95-1.00 | 5 N ammonium hydroxide |
| 5 | 2000 | 450 | 30 | wet formed, ⅛", 0.95-1.00 | 1 N oxalic acid |
| 6 | 2000 | 450 | 30 | wet formed, ⅛", 0.95-1.00 | 1 N metheneamine |
| 7 | 2000 | 450 | 30 | wet formed, ⅛", 0.95-1.00 | 1 N hydrochloric acid |
| 8 | 2000 | 450 | 30 | wet formed, ⅛", 0.95-1.00 | 1 N nitric acid |
| 9 | 2000 | 450 | 30 | wet formed, ⅛", 0.95-1.00 | 1 N phosphoric acid |
| 10 | 2000 | 550 | 15 | wet formed, ⅛", 0.95-1.00 | 1 N oxalic acid |
| 11 | 2000 | 550 | 15 | wet formed, ⅛", 0.95-1.00 | 1 N metheneamine |
| 12 | 2000 | 550 | 5 | wet formed, ⅛", 0.95-1.00 | 5 N ammonium hydroxide |
| 13 | 2000 | 550 | 5 | wet formed, ⅛", 0.95-1.00 | 1 N oxalic acid |
| 14 | 2000 | 550 | 5 | wet formed, ⅛", 0.95-1.00 | 1 N metheneamine |
| 15 | 3000 | 450 | 15 | wet formed, ⅛", 0.95-1.00 | 5 N ammonium hydroxide |
| 16 | 3000 | 450 | 15 | wet formed, ⅛", 0.95-1.00 | 1 N oxalic acid |
| 17 | 3000 | 450 | 15 | wet formed, ⅛", 0.95-1.00 | 1 N metheneamine |
| 18 | 3000 | 550 | 15 | wet formed, ⅛", 0.95-1.00 | 5 N ammonium hydroxide |
| 19 | 3000 | 550 | 15 | wet formed, ⅛", 0.95-1.00 | 1 N oxalic acid |
| 20 | 3000 | 550 | 15 | wet formed, ⅛", 0.95-1.00 | 1 N metheneamine |

We claim:

1. In a method of forming a decorative board including depositing fibers onto a surface to form a fibrous mat and compressing said fibrous mat to consolidate said mat into a consolidated board the improvement comprising wetting a surface of said consolidated board with ammonium hydroxide in an amount sufficient to wet substantially the entire surface to be embossed, embossing the wetted surface of said consolidated board with a contoured embossing surface at a pressure of at least 1000 p.s.i., at a temperature of at least 400° F. and for a period of time sufficient to permanently reshape said wetted surface.

2. A method as defined in claim 1 wherein the wetted board is embossed at a pressure in the range of about 1500 to 5000 p.s.i. and for a period of time from about 1 to 60 seconds.

3. A method as defined in claim 1 wherein said ammonium hydroxide is an aqueous solution of ammonium hydroxide at a concentration of at least about 5N.

4. A method as defined in claim 2 wherein the wetted board is embossed at a pressure in the range of about 3000 to 5000 p.s.i. and for a period of time from 1 to 30 seconds.

5. A method as defined in claim 1 wherein the man-made consolidated board is embossed against a compressible cushion.

6. A method as defined in claim 5 wherein the compressible cushion is a sheet of man-made board.

7. A method as defined in claim 5 wherein the compressible cushion is water-penetrable.

8. A method as defined in claim 1 wherein the man-made consolidated board is embossed in a platen press.

9. A method as defined in claim 5 wherein an adhesive is disposed between the board and the cushion to adhere the cushion to the board material during hot-pressing.

10. A method of embossing a consolidated man-made board comprising wetting the surface of a consolidated man-made board with an organic acid in an amount sufficient to wet substantially the entire surface to be embossed, embossing the wetted man-made board with a contoured embossing plate at a pressure of at least about 1000 p.s.i., at a temperature in the range of about 400° to 550° F. and for a period of time sufficient to permanently re-shape at least one surface of the man-made board.

11. A method as defined by claim 10 wherein the organic acid comprises oxalic acid.

12. In a method of forming a decorative board including depositing fibers onto a surface to form a fibrous mat and compressing said fibrous mat to consolidate said mat into a consolidated board the improvement comprising wetting a surface of said consolidated board with a mineral acid in an amount sufficient to wet substantially the entire surface to be embossed, embossing the wetted surface of said consolidated board with a contoured embossing surface at a pressure of at least 1000 p.s.i., at a temperature of at least 400° F. and for a period of time sufficient to permanently re-shape said wetted surface.

13. A method as defined by claim 12 wherein the mineral acid comprises hydrochloric acid.

14. A method as defined by claim 12 wherein the mineral acid comprises nitric acid.

15. A method as defined by claim 12 wherein the mineral acid comprises phosphoric acid.

16. In a method of forming a decorative board including depositing fibers onto a surface to form a fibrous mat and compressing said fibrous mat to consolidate said mat into a consolidated board the improvement comprising wetting a surface of said consolidated board with metheneamine in an amount sufficient to wet substantially the entire surface to be embossed, embossing the wetted surface of said consolidated board with a contoured embossing surface at a pressure of at least 1000 p.s.i., at a temperature of at least 400° F. and for a period of time sufficient to permanently re-shape said wetted surface.

* * * * *